United States Patent
Onoda et al.

(10) Patent No.: US 8,974,550 B2
(45) Date of Patent: Mar. 10, 2015

(54) MANUFACTURING METHOD OF NEGATIVE ELECTRODE PLATE FOR NON-AQUEOUS SECONDARY BATTERY AND MANUFACTURING METHOD OF NON-AQUEOUS SECONDARY BATTERY

(75) Inventors: Yusuke Onoda, Toyota (JP); Takahiro Tsubouchi, Miyoshi (JP); Tomohiko Ishida, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 155 days.

(21) Appl. No.: 13/578,645

(22) PCT Filed: Feb. 25, 2010

(86) PCT No.: PCT/JP2010/052962
§ 371 (c)(1),
(2), (4) Date: Aug. 13, 2012

(87) PCT Pub. No.: WO2011/104843
PCT Pub. Date: Sep. 1, 2011

(65) Prior Publication Data
US 2012/0311852 A1    Dec. 13, 2012

(51) Int. Cl.
*H01M 4/82* (2006.01)
*H01M 4/88* (2006.01)
(Continued)

(52) U.S. Cl.
CPC ............ *H01M 4/8828* (2013.01); *H01M 4/133* (2013.01); *H01M 4/1393* (2013.01); *H01M 4/661* (2013.01); *H01M 10/0525* (2013.01); *Y02E 60/122* (2013.01); *Y02E 60/50* (2013.01); *Y02T 10/7011* (2013.01)
USPC ....................................................... 29/623.1

(58) Field of Classification Search
None
See application file for complete search history.

(56) References Cited

U.S. PATENT DOCUMENTS

| 6,271,300 | B1 | 8/2001 | Ohsumi et al. |
| 2002/0182478 | A1 | 12/2002 | Uchida et al. |

(Continued)

FOREIGN PATENT DOCUMENTS

| CN | 101276905 | 10/2008 |
| CN | 101276907 | 10/2008 |

(Continued)

OTHER PUBLICATIONS

International Search Report in International Application No. PCT /JP2010/052962; Mailing Date: May 25, 2010.

*Primary Examiner* — Patrick Ryan
*Assistant Examiner* — Jose Colucci Rios
(74) *Attorney, Agent, or Firm* — Finnegan, Henderson, Farabow, Garrett & Dunner, LLP

(57) ABSTRACT

A method of manufacturing a negative electrode plate for a non-aqueous secondary battery is disclosed, in which it is possible to assess whether or not a binder is localized in an electrode surface without lowering the productivity of the negative electrode plate. The method includes coating an electrode mixture containing at least a negative electrode active material and a binder to a current collector and drying the coated electrode mixture. The method includes an inspection step of measuring a reflectance of a coating surface of the negative electrode plate to thereby determine the quality of the negative electrode plate. If the reflectance of the coating surface of the negative electrode plate falls within a range of 15 to 35% when an incident angle and a light receiving angle each fall within the range of 80° to 90°, the negative electrode plate is determined to be excellent.

6 Claims, 4 Drawing Sheets

(51) Int. Cl.
*H01M 4/133* (2010.01)
*H01M 4/1393* (2010.01)
*H01M 4/66* (2006.01)
*H01M 10/0525* (2010.01)

(56) References Cited

U.S. PATENT DOCUMENTS

| | | | |
|---|---|---|---|
| 2008/0176144 A1* | 7/2008 | Iwama et al. | 429/338 |
| 2008/0187832 A1* | 8/2008 | Takezawa et al. | 429/209 |
| 2008/0199775 A1 | 8/2008 | Takezawa et al. | |
| 2009/0317718 A1 | 12/2009 | Imachi et al. | |
| 2010/0055569 A1* | 3/2010 | Divigalpitiya et al. | 429/231.5 |
| 2011/0129736 A1 | 6/2011 | Muraoka et al. | |
| 2012/0318462 A1* | 12/2012 | Nagare et al. | 156/443 |

FOREIGN PATENT DOCUMENTS

| | | |
|---|---|---|
| CN | 102160218 | 8/2011 |
| JP | 2002-63909 | 2/2002 |
| JP | 2003-249212 | 9/2003 |
| JP | 2003-279508 | 10/2003 |
| JP | 2005-67920 | 3/2005 |
| JP | 2005-251481 | 9/2005 |
| JP | 2006-107780 | 4/2006 |
| JP | 2006-172976 | 6/2006 |
| JP | 9-25454 | 1/2007 |
| JP | 2008-210786 | 9/2008 |
| JP | 2009-37893 | 2/2009 |
| JP | 2009-64564 | 3/2009 |

* cited by examiner

MANUFACTURING METHOD OF NEGATIVE ELECTRODE PLATE FOR NON-AQUEOUS SECONDARY BATTERY AND MANUFACTURING METHOD OF NON-AQUEOUS SECONDARY BATTERY

CROSS-REFERENCE TO RELATED APPLICATIONS

This application is a national phase application of International Application No. PCT /JP2010/052962, filed Feb. 25, 2010, the content of which is incorporated herein by reference.

TECHNICAL FIELD

The present invention relates to a method of manufacturing a negative electrode plate for a non-aqueous secondary battery and to a method of manufacturing a non-aqueous secondary battery.

BACKGROUND ART

Recently, lithium ion secondary batteries, which have high energy density and are also clean, have attracted great attention and high expectations.

Lithium ion secondary batteries, including a negative electrode containing a carbon material capable of doping and undoping lithium and a positive electrode containing a lithium complex oxide such as lithium cobalt oxide or lithium nickel oxide, have been actively developed in recent years. With optimization of the design capacity of the positive electrode/negative electrode, these lithium ion secondary batteries can eliminate growth of lithium dentrites which can be observed in batteries using lithium metals, can provide excellent properties such as low self-discharge, excellent cycle characteristics, and safety properties, as well as excellent low-temperature characteristics, load characteristics, or high-speed charging properties. As such, there are increased expectations for the lithium ion secondary batteries. At the same time, the lithium ion secondary batteries have been currently put into practical use as a power source for portable devices such as laptop computers, word processors, camera-integrated VTR, liquid crystal televisions, cellular phones, and so on.

Further, in addition to the use for these compact consumer products, technical developments of lithium ion secondary batteries as power storage devices or large-capacity and large-size batteries for electric vehicles and other applications have been accelerated. In particular, the development of lithium ion secondary batteries for hybrid electric vehicles has been rapidly pursued.

In the process of manufacturing electrodes in lithium ion secondary batteries, an electrode mixture having flowability is applied to a metal leaf which is a current collector and is then dried, thereby manufacturing the electrodes (positive electrode and negative electrode). The electrode mixture composition is composed of an active material which directly contributes to a battery reaction (a charge/discharge reaction), a conductive agent for supporting this battery reaction, a binder for binding these materials, and a diluted solvent and a thickening agent for achieving uniform mixture and application of these materials, or the like.

The drying process performed after application is aimed at evaporating especially the diluted solvent in the electrode mixture which does not contribute to the battery reaction. At this time, however, due to convection of the binder within the electrode mixture, there is a possibility that the binder fails to be distributed uniformly in the coating and is localized in the surface of the coating (electrode surface). Such an uneven distribution or localization of the binder to the electrode surface would cause problems in manufacturing, including an increase in the resistance in the electrode surface to prevent smooth progress of the charge/discharge reaction or result in peeling of the electrode mixture from the current collector, and so on.

Accordingly, in order to suppress the uneven distribution or localization of the binder, Patent Document 1, for example, discloses a method of drying an electrode mixture of a negative electrode under control of the rate of removing moisture, during the drying process.

Further, Patent Document 2, for example, discloses a method in which, during the drying process, drying is performed under the condition that the temperature of hot air supplied from above the electrode is 90° C. or less and the temperature of hot air supplied from below the electrode is 110° C. or more.

Also, Patent Document 3, for example, discloses a method of applying an electrode mixture containing carboxymethylcellulose and a pH adjustor and a having a pH of 5 or greater and 9 or less onto a current collector, and drying the electrode mixture.

In addition, Patent Document 4, for example, discloses a method of applying an electrode mixture containing vinyl polymer onto a current collector and drying the electrode mixture.

PRIOR ART REFERENCES

Patent Documents

Patent Document 1: JP 2009-37893 A
Patent Document 2: JP 2005-251481 A
Patent Document 3: JP 2009-64564 A
Patent Document 4: JP 9-25454 A
Patent Document 5: JP 2003-249212 A
Patent Document 6: JP 2006-172976 A
Patent Document 7: JP 2005-67920 A
Patent Document 8: JP 2002-63909 A

SUMMARY OF INVENTION

Technical Problems

In the above-described Patent Documents, however, because the assessment as to whether the binder is evenly distributed in the coating is not performed, there is a possibility that, during the actual manufacturing process, an electrode is assembled into a battery in the state in which the binder is localized in the electrode surface.

Patent Document 5, for example, discloses technology in which the density of an electrode mixture applied to a current collector is assessed by means of the X-ray fluorescence method, the X-ray photoelectron spectroscopy, the energy dispersive X-ray method, the total reflection fluorescence method, and other methods, and drying conditions are varied in accordance with the assessment result. With the method disclosed in Patent Document 5, however, because the measurements take time, productivity may be lowered.

Further, Patent Document 6 discloses technology of assessing the distribution state of a binder in the cross section of an electrode by an electron probe microanalyzer (EPMA). However, the method disclosed in Patent Document 6, in which it is necessary to cut off a portion of an electrode for assessment and analysis using the EPMA, takes time and labor. Further, with this technology, because the apparatus is expensive, the method is not practical.

Further, Patent Documents 7 and 8 disclose technology of assessing the glossiness of a surface of a subject of measurement, although the subject of measurement is not an electrode of a lithium ion secondary battery. As the subject of measurement in the method disclosed in Patent Documents 7 and 8 is completely different from that of the present invention, it is not possible to assess the uneven distribution or localization of the binder in the electrode surface by using the methods disclosed in Patent Documents 7 and 8.

The present invention is aimed at providing a method of manufacturing a negative electrode plate for a non-aqueous secondary battery, in which whether or not a binder is localized in an electrode surface can be assessed without lowering productivity of the negative electrode plate of the non-aqueous secondary battery.

Solution to Problems (1) In accordance with an aspect of the invention, there is provided a method of manufacturing a negative electrode plate for a non-aqueous secondary battery by coating an electrode mixture containing at least a negative electrode active material and a binder to a current collector and drying the electrode mixture which is coated, the method comprising: an inspection step of measuring, after the coating and drying, a reflectance of a coating surface of the negative electrode plate to thereby determine the quality of the negative electrode plate, wherein, during the inspection process, if the reflectance of the coating surface of a negative electrode plate satisfies a range of 15 to 35% when an incident angle and a light receiving angle each fall within the range of 80° to 90°, the negative electrode plate is determined to be excellent.

(2) In the manufacturing method of a negative electrode plate for non-aqueous secondary battery according to (1) above, each of the incident angle and the light receiving angle is 85°.

(3) In the manufacturing method of a negative electrode plate for non-aqueous secondary battery according to (1) above, the reflectance of the coating surface of the negative electrode plate falls within a range of 15 to 25%.

(4) In accordance with another aspect of the invention, there is provided a method of manufacturing a non-aqueous secondary battery comprising a positive electrode plate, a negative electrode plate, and a non-aqueous electrolyte interposed between the positive electrode plate and the negative electrode plate, the negative electrode plate being manufactured by the method according to any one of (1) to (3).

Advantageous Effects of Invention

According to the present invention, it is possible to assess whether or not a binder is localized in an electrode surface without lowering productivity of a negative electrode plate of a non-aqueous secondary battery.

BRIEF DESCRIPTION OF THE DRAWINGS

These and other objects of the invention will be explained in the description below, by reference to the accompanying drawings, in which.

BEST MODE FOR CARRYING OUT THE INVENTION

A preferred embodiment of the present invention will be described with reference to the drawings.

Figure 1:
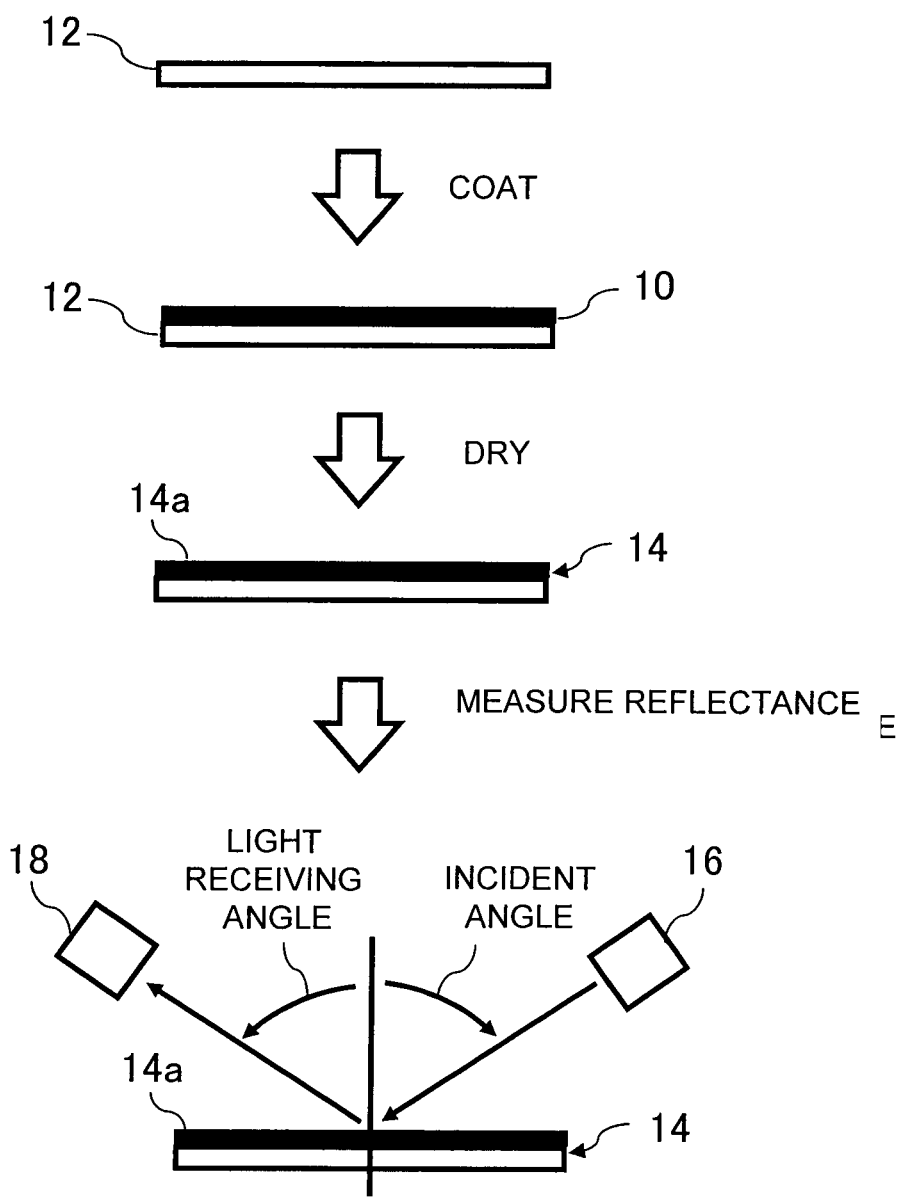
FIG. 1 is a flow diagram for explaining a method of manufacturing a negative electrode plate for a non-aqueous secondary battery according to the present embodiment.

FIG. 1 is a flow diagram for explaining a method of manufacturing a negative electrode plate for a non-aqueous secondary battery according to the present embodiment. As illustrated in FIG. 1, first, a negative electrode active material, a binder, a diluted solvent, and a thickening agent are mixed together to produce a negative electrode mixture (paste) 10, and the negative electrode mixture 10 is applied to a current collector 12 such as a copper foil and dried, so that a negative electrode plate 14 is obtained. Then, the reflectance of a coating surface 14a of the negative electrode plate 14 after coating and drying is measured to determine the quality of the negative electrode plate 14. More specifically, as illustrated in FIG. 1, a light source 16 and a light receiving unit 18 are disposed such that the incident angle and the light receiving angle each fall within the range of 80° to 90°, and are preferably 85°, and the reflectance when the incident angle and the light receiving angle each fall within the range of 80° to 90° (preferably 85°) is measured and is represented by a percentage obtained when the glossiness of a reference surface for mirror surface glossiness is defined as 100. As illustrated in FIG. 1, the incident angle and the light receiving angle are an angle of the light source 16 and an angle of the light receiving unit 18 with respect to a normal line which is drawn with respect to the negative electrode plate.

If the reflectance of the coating surface 14a of the negative electrode plate 14 which is obtained as described above satisfies the range of 15% to 35%, the negative electrode plate 14 is determined to be excellent. Specifically, when the reflectance of the coating surface 14a of the negative electrode plate 14 falls within the above-described range, it is possible to determine that the binder is uniformly distributed and the negative electrode plate 14 for a non-aqueous secondary battery has excellent electrode performance and excellent peel strength of the coating. On the other hand, when the reflectance of the coating surface 14a of the negative electrode plate 14 exceeds 35%, it can be determined that the binder is localized in the coating surface (i.e. not uniformly distributed) and the negative electrode plate 14 for a non-aqueous secondary battery is poor. The negative electrode plate 14 for a non-aqueous secondary battery in which the binder is localized in the coating surface 14a as described above suffers from problems that the surface resistance is increased to thereby prevent smooth progress of the charge/discharge reaction or that the coating (the negative electrode mixture 10) would be peeled from the current collector 12. When the reflectance is measured under the above condition and the negative electrode plate 14 for a non-aqueous secondary battery is determined to be poor, it is preferable to reset the manufacturing conditions such as the drying time and temperature to an appropriate range. Here, the negative electrode plate 14 for a non-aqueous secondary battery which is determined to be poor is marked, for example, so that it can be separated from the manufacturing line of the negative electrode plate 14 for a non-aqueous secondary battery which is determined to be excellent.

According to the present embodiment, when the negative electrode mixture 10 is continuously applied on the belt-like current collector 12, it is also possible to continuously measure, at the predetermined time intervals, the reflectance of the coating surface 14a of the negative electrode 14 after being dried under the above conditions and determine the quality of the negative electrode plate 14. For example, the reflectance of the coating surface 14a of the negative electrode plate 14 when the incident angle and the light receiving angle each fall within the range of 80° to 90° (preferably 85°) is continuously measured at the predetermined time intervals, and a negative electrode plate 14 in which all the reflectance values continuously measured in this manner satisfy the range of 15 to 35% is determined to be excellent. As such, in the present embodiment, it is possible to measure the reflectance on-line while coating is continuously performed.

The method of measuring the reflectance and assessing whether or not the binder is localize in the coating surface 14a according to the present embodiment achieves the following advantages, including, for example, (1) it is a simple method which does not require the use of special devices; (2) it is possible to assess whether or not the binder is localized in a short time without breaking the negative electrode plate; (3) as the assessment can be performed in a short time by a simple method without breaking, it is possible to confirm the quality on-line during the manufacturing process of the electrode; and (4) as the quality confirmation can be performed on-line, feedback of the assessment result to the manufacturing conditions such as the drying time and drying temperature can be achieved.

The negative electrode plate for a non-aqueous secondary battery after the inspection process described above is further subjected to pressing processing, slitting processing, and other processing, so that a negative electrode plate for a non-aqueous secondary battery which is processed to a desired dimension can be produced.

The structure of the negative electrode mixture 10 which is used in the present embodiment will now be described.

For the negative electrode active material forming the negative electrode mixture 10, natural graphite, spheroidal or fibrous artificial graphite, easily-graphitized carbon such as coke, hardly-graphitized carbon such as phenol resin sintered bodies, and so on, for example, are used, but the negative electrode active material is not limited to these examples. It is preferable that the negative electrode active material is a powder having a grain size in the range of 1 to 100 μm and having an average grain size in the range of 3 to 30 μm, for example, so that the negative electrode active material can be distributed uniformly in the coated film.

No particular limitation is imposed on the binder forming the negative electrode mixture 10, so long as the binder can bind the negative electrode active materials together and the negative electrode active material and the current collector 12 together, and it is desirable to adopt a synthetic rubber latex binder, for example. As the synthetic rubber latex binder, there can be used any one or more types of styrene-butadiene rubber latex, nitrile-butadiene rubber latex, methyl methacrylate butadiene rubber latex, chloroprene rubber latex, and carboxy modified styrene butadiene rubber latex.

It is desirable that the ratio of the content of the binder in the negative electrode mixture 10 is 0.5 weight % or more of the binder weight when the negative electrode active material is 100 weight %, from the viewpoint of enhancing the binding property between the carbon material which is the negative electrode active material and the current collector 12. Further, because a high ratio of the content of the binder affects the uniform distribution property or the like of the binder, it is necessary to appropriately set the ratio of the content of the binder in the negative electrode mixture 10 within a range which satisfies the conditions of the reflectance described above.

The diluted solvent and the thickening agent forming the negative electrode mixture 10 mainly serve to disperse the negative electrode active material and the binder and so on in the negative electrode mixture 10. The thickening agent further has a function of binding the negative electrode active materials together and binding the negative electrode active material and the current collector 12 together. Here, the ratio of the content of the thickening agent in the negative electrode mixture 10 is determined in consideration of the contents of the negative electrode active material, the binder, and so on, and, in view of the uniform distribution property of the negative electrode active material and the binder, is desirably set appropriately to a range which satisfies the conditions of the reflectance described above.

Examples of the diluted solvent include, for example, water, alcohol, and so on. As the thickening agent, there can be used one or two or more types of cellulose resin selected from a group consisting of methyl cellulose, ethyl cellulose, benzyl cellulose, triethyl cellulose, cyanoethyl cellulose, carboxymethyl cellulose, carboxyethyl cellulose, aminoethyl cellulose, oxyethyl cellulose, and so on.

A positive electrode plate for a non-aqueous secondary battery will be briefly described.

First, a positive electrode active material, a conductive agent, a binder, a diluted solvent, and a thickening agent are mixed together to produce a positive electrode mixture (paste), and the positive electrode mixture is applied to a current collector 12 such as an aluminum foil and so on and dried. Thereafter, pressing processing and slitting processing are performed as necessary, to thereby produce a positive electrode plate for a non-aqueous secondary battery which is processed to have a predetermined dimension.

For the positive electrode active material forming the positive electrode mixture, layered rock salt type lithium metal composite oxides such as $LiCoO_2$, $LiNiO_2$, $LiMn_2O_4$, and so on are used. However, the positive electrode active material is not limited to the above-described examples, so long as the positive electrode active material can occlude and discharge lithium and can achieve a charge/discharge reaction.

Further, the conductive agent forming the positive electrode mixture serves to increase the electrical conductivity of the positive electrode plate for a non-aqueous secondary battery, and a carbon material such as acetylene black, ketjen black, or graphite is used.

Also, no particular limitation is imposed on the binder forming the positive electrode mixture, so long as the binder can bind the positive electrode active materials together or bind the positive electrode active material and the current collector 12 together, and polytetrafluoroethylene (PTFE) or polyvinylidene fluoride (PVDF), for example, is used.

Furthermore, while these materials are mixed to produce the positive electrode mixture paste, it is possible to adjust the ratio of mixture of these materials and so on as desired in accordance with the applicability of the battery.

For example, the negative electrode plate (in a sheet form, for example) and the positive electrode plate (in a sheet form, for example) which are obtained as described above are wound in a closely adhered state via a separator to form a wound body. This wound body is mounted within a battery can and then, a non-aqueous electrolyte is doped into the battery can. Thereafter, the battery can and a battery cap are crimped together with an insulating sealing gasket being interposed therebetween, so that a non-aqueous secondary battery is produced. The non-aqueous electrolyte is obtained, for example, by dissolving lithium salt such as $LiPF_6$, $LiClO_4$, and so on in an organic solvent. For the organic solvent, a cyclic carbonate such as ethylene carbonate or propylene carbonate, a chain carbonate such as diethyl carbonate, dimethyl carbonate, ethylmethyl carbonate, and so on, are used alone or in a mixed form.

Further, no particular limitation is imposed on the shape of the non-aqueous secondary battery, and a cylindrical shape, a rectangular shape, a coin shape, or a button shape may be used. Also, the non-aqueous secondary battery may have various sizes including a thin size, a large size, and so on.

The non-aqueous secondary battery in which the negative electrode plate 14 for a non-aqueous secondary battery obtained by the manufacturing method according to the present embodiment can be used as a small-size power source for mobile equipment such as a cellular phone or a portable personal computer, a power source for a vehicle, a consumer power source, and so on.

EXAMPLES

While the present invention will be described in more specific details with reference to the following examples, the present invention is not limited to these examples.

Example 1

First, carboxymethyl cellulose (a thickening agent: BSH-6 manufactured by Dai-ichi Kogyo Seiyaku Co., Ltd.) was dissolved in water (a solvent) to obtain a 1% carboxymethyl cellulose solution, and natural graphite (a negative electrode active material) having an average particle size of 11 μm was added to the solution and mixed by a twin-shaft planetary mixer having a capacity of 5 L. Thereafter, water and styrene butadiene rubber latex (a binder: TRD2001 manufactured by JSR Corporation) were further added to prepare a negative electrode mixture paste such that the solid content ratio of the natural graphite, carboxymethyl cellulose, and styrene butadiene rubber latex was 98:1:1 in the compounding ratio, and the solid content was 46 weight %.

Then, with the use of a comma coater (manufactured by Toray Engineering Co., Ltd), the negative electrode mixture paste was coated to a copper foil having a thickness of 10 μm at a coating rate of 5 m/min, and was dried under the four drying conditions (A) to (D) indicated by the following Table 1, to produce negative electrode plates A to D. The coater used in Example 1 includes three sectioned drying zones, and the drying temperature and the rotational speed of the fan (air quantity) can be changed for each zone.

TABLE 1

| DRYING CONDITION | DRY TEMPERATURE | | | FAN ROTATIONAL SPEED |
|---|---|---|---|---|
| | FIRST ZONE | SECOND ZONE | THIRD ZONE | |
| (A) | 50° C. | 50° C. | 50° C. | 800 rpm |
| (B) | 100° C. | 100° C. | 120° C. | 800 rpm |
| (C) | 80° C. | 80° C. | 120° C. | 1500 rpm |
| (D) | 120° C. | 120° C. | 120° C. | 2000 rpm |

Next, a light source and a light receiving unit were disposed such that the incident angle and the light receiving angle were 0°, 60°, or 85°, and the reflectance of each of the negative electrode plates A to D was measured. The results are shown in Table 2.

TABLE 2

| | INCIDENT ANGLE AND LIGHT RECEIVING ANGLE | | |
|---|---|---|---|
| | 0° | 60° | 85° |
| REFLECTANCE OF NEGATIVE ELECTRODE PLATE A | 60.2% | 4.9% | 21.2% |
| REFLECTANCE OF NEGATIVE ELECTRODE PLATE B | 63.0% | 5.4% | 24.2% |
| REFLECTANCE OF NEGATIVE ELECTRODE PLATE C | 62.9% | 5.5% | 29.5% |
| REFLECTANCE OF NEGATIVE ELECTRODE PLATE D | 61.3% | 5.5% | 39.8% |

Subsequently, the distribution state of the binder in the coating was measured by the method disclosed in JP 2006-172976 A. More specifically, the negative electrode plates were observed by an EPMA and the localization values of the binder were measured. The results are shown in Table 3.

TABLE 3

| | BINDER LOCALIZATION VALUE |
|---|---|
| NEGATIVE ELECTRODE PLATE A | 1.16 |
| NEGATIVE ELECTRODE PLATE B | 1.28 |
| NEGATIVE ELECTRODE PLATE C | 1.59 |
| NEGATIVE ELECTRODE PLATE D | 2.00 |

Figure 2:
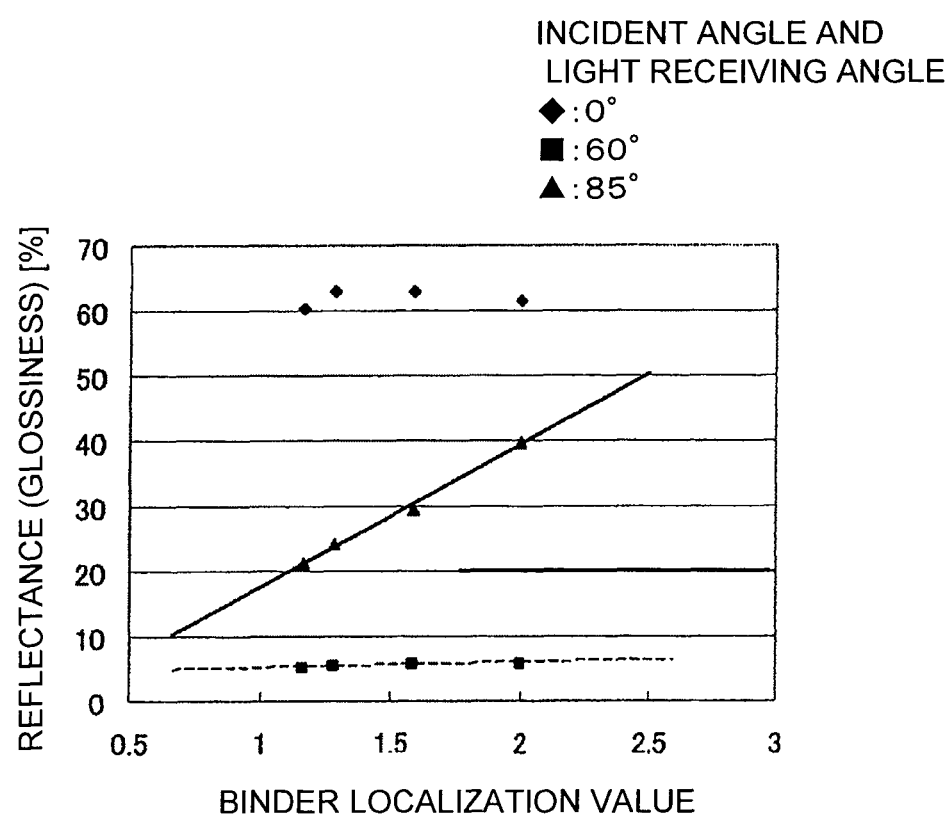
FIG. 2 is a view illustrating a relationship between binder localization values obtained by EPMA and reflectance values at incident angles and light-receiving angles of 0°, 60', and 85°.

FIG. 2 illustrates the relationship between the localization value of the binder obtained by an EPMA and the reflectance at the incident and light receiving angles of 0°, 60°, or 85°. As can be understood from FIG. 2, when the incident angle and the light receiving angle were 0°, the reflectance values of all the negative electrode plates A to D were high and no correlation between the reflectance values and the localization values of the binder could be identified. Also, when the incident angle and the light receiving angle were 60°, while the reflectance value slightly increases with an increase of the localization value of the binder, clear correlation could not be identified. When the incident angle and the light receiving angle were 85°, on the other hand, the reflectance values of the negative electrode plates A to D increase with the increase of the localization value of the binder, and a positive correlation could be identified. As such, it was confirmed that determination of the uneven distribution or localization of the binder can be made by measuring the reflectance when the incident angle and the light receiving angle are 85°.

Figure 3:
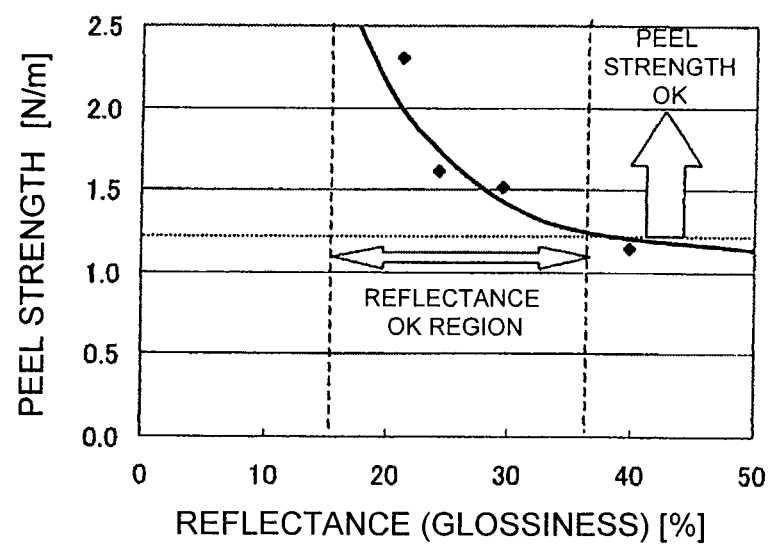
FIG. 3 is a view illustrating a relationship between reflectance values and peel strengths of negative electrode plates A to D when the incident angle and light-receiving angle are 85°.

Next, the peel strength test was performed for the coated film of the negative electrode plates A to D, based on JIS6854-1. FIG. 3 illustrates a relationship between the reflectance of the negative electrode plates and the peel strength when the incident angle and the light receiving angle were 85°. In the actual manufacturing process, when the peel strength is lower than 1.2 N/m, the coated film is peeled easily and the productivity of a non-aqueous secondary battery is lowered. Accordingly, in order to prevent a lowering in the productivity of a non-aqueous secondary battery, the peel strength must be 1.2 N/m or more, preferably 1.7 N/m or more.

It can be determined from FIG. 3 that, in order to secure sufficient peel strength of the negative electrode plate, the reflectance of the coating surface of the negative electrode plate must fall within the range of 15 to 30%, preferably within the range of 15 to 25%. Further, when the reflectance of the coating surface of the negative electrode plate falls within the range of 15 to 30%, the localization values of the binder are also low, as illustrated in FIG. 2, and it can therefore be determined that uniform distribution property of the binder can be secured.

Consequently, if a negative electrode plate satisfies a condition that the reflectance of the coating surface of the negative electrode plate falls within the range of 15 to 30% when incident angle and the light receiving angle are 85° (±5°, it can be determined that a sufficient peel strength is secured for the negative electrode plate without localization of the binder in the coating surface.

Example 2

A negative electrode mixture paste similar to that used in Example 1 was prepared and coated on a copper foil having a thickness of 10 μm, at a coating rate of 5 m/min by a comma coater (manufactured by Toray Engineering Co., Ltd). After the coating, the negative electrode plate was dried with the drying temperatures for the first to third zones being set to 80° C., 80° C., and 120° C., respectively, and the speed of rotation of the fan being adjusted to 800 rpm.

After passing through the third zone, the negative electrode plate was taken up by the take-up unit. Here, a light source and a light receiving unit were disposed between the third zone and the take-up unit, and the reflectance of the negative electrode plate passing through the third zone was continuously measured for every one minute of coating time. In the measurement of reflectance of the negative electrode plate in Example 2, the light source and the light receiving unit were disposed such that the incident angle and the light receiving angle were each 85°.

Figure 4:
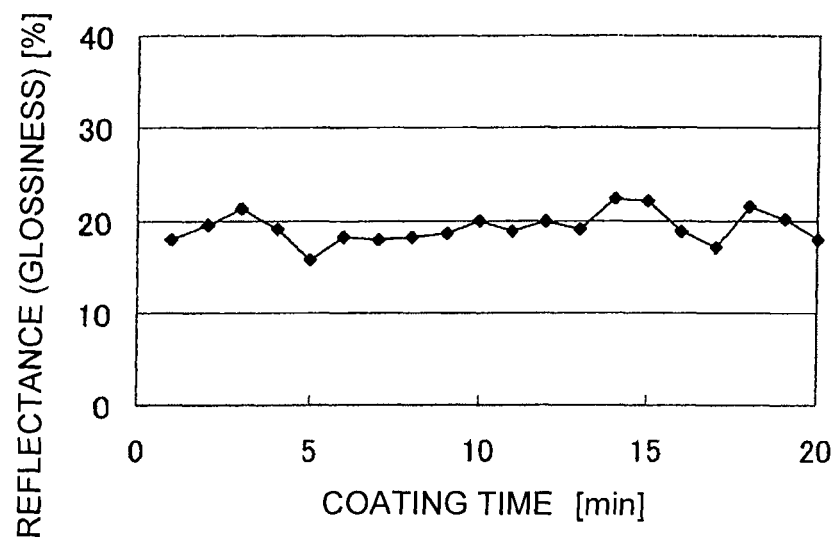
FIG. 4 is a view illustrating the reflectance of a coating surface of a negative electrode plate measured every one minute of coating time.

FIG. 4 illustrates the reflectance of the coating surface of the negative electrode plate measured for every one minute of coating time. As illustrated in FIG. 4, according to the method of Example 2, it was confirmed that on-line measurement during the manufacturing process of the negative electrode plate is possible. Further, the peel strength of the coating of the negative electrode which was measured at this time was 2.2 N/m on average. Also, removal of the coating and so on was not observed during the manufacturing process of a non-aqueous secondary battery, and effective manufacturing of non-aqueous secondary batteries could be achieved.

As described above, it can be determined that because the method of assessing localization of a binder by measuring the reflectance of the coating surface of a negative electrode plate after the negative electrode plate is dried is simple and enables assessment of the negative electrode without breaking the negative electrode, this method can contribute to the development of superior negative electrodes and management of the manufacturing process and so on.

Reference Symbols List 10 negative electrode mixture, 12 current collector, 14 negative electrode plate, 14a coating surface, 16 light source, 18 light receiving unit.

The invention claimed is:

1. A method of manufacturing a negative electrode plate for a non-aqueous secondary battery by coating an electrode mixture containing at least a negative electrode active material and a binder to a current collector and drying the electrode mixture which is coated, the method comprising:
   an inspection step of measuring, after the coating and drying, a reflectance of a coating surface of the negative electrode plate to thereby determine the quality of the negative electrode plate, and assessing whether a binder is localized in the coating surface of the negative electrode plate,
   wherein, during the inspection process, the reflectance of the coating surface of the negative electrode plate falls within a range of 15 to 35% when an incident angle and a light receiving angle each fall within the range of 80° to 90%, the negative electrode plate is determined to be excellent, and
   wherein the negative electrode active material is a carbon material and the binder is a resin material.

2. The manufacturing method of a negative electrode plate for non-aqueous secondary battery according to claim 1, wherein
   the incident angle and the light receiving angle are each 85°.

3. The manufacturing method of a negative electrode plate for non-aqueous secondary battery according to claim 1, wherein
   the reflectance of the coating surface of the negative electrode plate falls within a range of 15 to 25%.

4. A method of manufacturing a non-aqueous secondary battery comprising a positive electrode plate, a negative electrode plate, and a non-aqueous electrolyte interposed between the positive electrode plate and the negative electrode plate,
   wherein the negative electrode plate is manufactured by the method according to claim 1.

5. A method of manufacturing a non-aqueous secondary battery comprising a positive electrode plate, a negative electrode plate, and a non-aqueous electrolyte interposed between the positive electrode plate and the negative electrode plate,
   wherein the negative electrode plate is manufactured by the method according to claim 2.

6. A method of manufacturing a non-aqueous secondary battery comprising a positive electrode plate, a negative electrode plate, and a non-aqueous electrolyte interposed between the positive electrode plate and the negative electrode plate,
   wherein the negative electrode plate is manufactured by the method according to claim 3.

* * * * *